US009300104B1

(12) United States Patent
Lazaro, Jr. et al.

(10) Patent No.: US 9,300,104 B1
(45) Date of Patent: Mar. 29, 2016

(54) ELECTRICAL CONTACT INSERTION TOOL

(71) Applicant: The Boeing Company, Seal Beach, CA (US)

(72) Inventors: Luis J. Lazaro, Jr., Shoreline, WA (US); Wesley M. Johnson, Snohomish, WA (US); Curtis A. Davis, Portland, OR (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 13/847,882

(22) Filed: Mar. 20, 2013

(51) Int. Cl.

| | |
|---|---|
| ***B23P 19/00*** | (2006.01) |
| ***H01R 43/22*** | (2006.01) |
| *E21B 47/01* | (2012.01) |
| *E21B 47/06* | (2012.01) |
| *G02B 6/50* | (2006.01) |

(52) U.S. Cl.

CPC ................. *H01R 43/22* (2013.01); *E21B 47/01* (2013.01); *E21B 47/06* (2013.01); *G02B 6/50* (2013.01)

(58) Field of Classification Search

CPC .......................... H01R 43/16; Y10T 29/49208

USPC ........... 29/758, 876, 52, 54, 56.6, 33 F, 33 K, 29/711, 721, 729, 739, 742, 748, 760, 762, 29/278, 281.283

See application file for complete search history.

(56) References Cited

U.S. PATENT DOCUMENTS

| | | | | | |
|---|---|---|---|---|---|
| 3,010,193 | A * | 11/1961 | Croall, Jr. et al. | 29/278 |
| 3,074,155 | A * | 1/1963 | Hahn et al. | 29/739 |
| 3,871,057 | A * | 3/1975 | Moulin | 29/825 |
| 3,967,356 | A * | 7/1976 | Holt | 29/701 |
| 4,501,054 | A * | 2/1985 | Morgan | 29/235 |
| 5,177,846 | A * | 1/1993 | Bryant | 29/237 |
| 5,453,016 | A * | 9/1995 | Clark et al. | 439/79 |
| 5,504,989 | A * | 4/1996 | Clark et al. | 29/747 |
| 5,655,294 | A * | 8/1997 | Makino | 29/845 |
| 2005/0060878 | A1* | 3/2005 | Hasircoglu et al. | 29/764 |
| 2007/0011857 | A1* | 1/2007 | Francis et al. | 29/426.5 |

FOREIGN PATENT DOCUMENTS

| | | | | |
|---|---|---|---|---|
| EP | 0848462 A2 | | 6/1998 | |
| EP | 848462 A2 | * | 6/1998 | H01R 43/22 |

* cited by examiner

*Primary Examiner* — Paul D Kim

(74) *Attorney, Agent, or Firm* — Armstrong Teasdale LLP

(57) ABSTRACT

An electrical contact insertion tool includes an insertion assembly, a handle assembly slidably coupled to the insertion assembly such that the insertion assembly is translatable between a first position with respect to the handle assembly and a second position with respect to the handle assembly, and a retention mechanism selectively movable between a first configuration and a second configuration. The handle assembly is configured to retain the insertion assembly in the first position with a first predetermined amount of force when the insertion assembly is in the first position. The retention mechanism is configured to retain an object between the retention mechanism and the insertion assembly with a second predetermined amount of force when the retention mechanism is in the second configuration.

7 Claims, 4 Drawing Sheets

ELECTRICAL CONTACT INSERTION TOOL

BACKGROUND

The present disclosure relates generally to hand tools and, more particularly, to an electrical contact insertion tool.

Known electrical contact insertion tools are configured to install electrical contacts (i.e., couple the electrical contact to an electrical connector). In use, an electrical wire is attached to an electrical contact prior to insertion of the electrical contact into the electrical connector. Improperly installed electrical contacts, also referred to as unseated contacts, may result in an open electrical circuit and thus generally lead to system errors. In an aircraft operation environment, such system errors may result in delaying a flight and/or grounding an aircraft. Identifying and reinstalling an unseated contact after manufacture may be time consuming and/or tedious. To reduce a number of improperly installed electrical contacts, at least some electrical contacts are "pull tested" during manufacture by pulling on the wire that has been attached to the electrical contact. Pull testing each electrical contact/wire combination, however, may be time-consuming and/or tedious.

BRIEF SUMMARY

In one aspect, a method is provided for inserting an electrical contact into an electrical connector. The method includes positioning the electrical contact with respect to an insertion assembly, moving a retention mechanism towards a flexed configuration to retain a wire coupled to the electrical contact between the retention mechanism and the insertion assembly, and advancing a handle assembly towards an opening defined by a grommet of the electrical connector such that at least a distal end of the insertion assembly is positioned within the opening, and the handle assembly moves from a first position towards a second position when a longitudinal force applied to the insertion assembly is greater than a first predetermined threshold. The insertion assembly extends from the handle assembly.

In another aspect, an electrical contact insertion tool is provided. The electrical contact insertion tool includes an insertion assembly, a handle assembly slidably coupled to the insertion assembly such that the insertion assembly is translatable between a first position with respect to the handle assembly and a second position with respect to the handle assembly, and a retention mechanism selectively movable between a first configuration and a second configuration. The handle assembly is configured to retain the insertion assembly in the first position with a first predetermined amount of force when the insertion assembly is in the first position. The retention mechanism is configured to retain an object between the retention mechanism and the insertion assembly with a second predetermined amount of force when the retention mechanism is in the second configuration.

In yet another aspect, an electrical contact insertion tool is provided. The electrical contact insertion tool includes an insertion assembly, a handle assembly configured to move from a first position towards a second position when a longitudinal force applied to the insertion assembly is greater than a first predetermined amount of force, and a retention mechanism configured to retain an object between the retention mechanism and the insertion assembly with a second predetermined amount of force when the retention mechanism is in a flexed configuration.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to hand tools and, more particularly, to an electrical contact insertion tool. In one embodiment, an electrical contact insertion tool is provided for ensuring a positive insertion of an electrical contact into an electrical connector member that is sometimes referred to herein as a grommet. The electrical contact insertion tool includes an insertion assembly, a handle assembly slidably coupled to the insertion assembly, and a retention mechanism. The retention mechanism retains a wire coupled to the electrical contact between the retention mechanism and the insertion assembly, and the handle assembly is advanced to install the electrical contact. The handle assembly moves from a first position towards a second position when a longitudinal force applied to install the electrical contact results in a force that is greater than a first predetermined threshold. If the electrical contact is properly installed, the electrical contact will be released from the insertion tool as the handle assembly is withdrawn from the opening. If the electrical contact is not properly installed, the wire will remain retained between the retention mechanism and the insertion assembly as the handle assembly is withdrawn from the opening.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
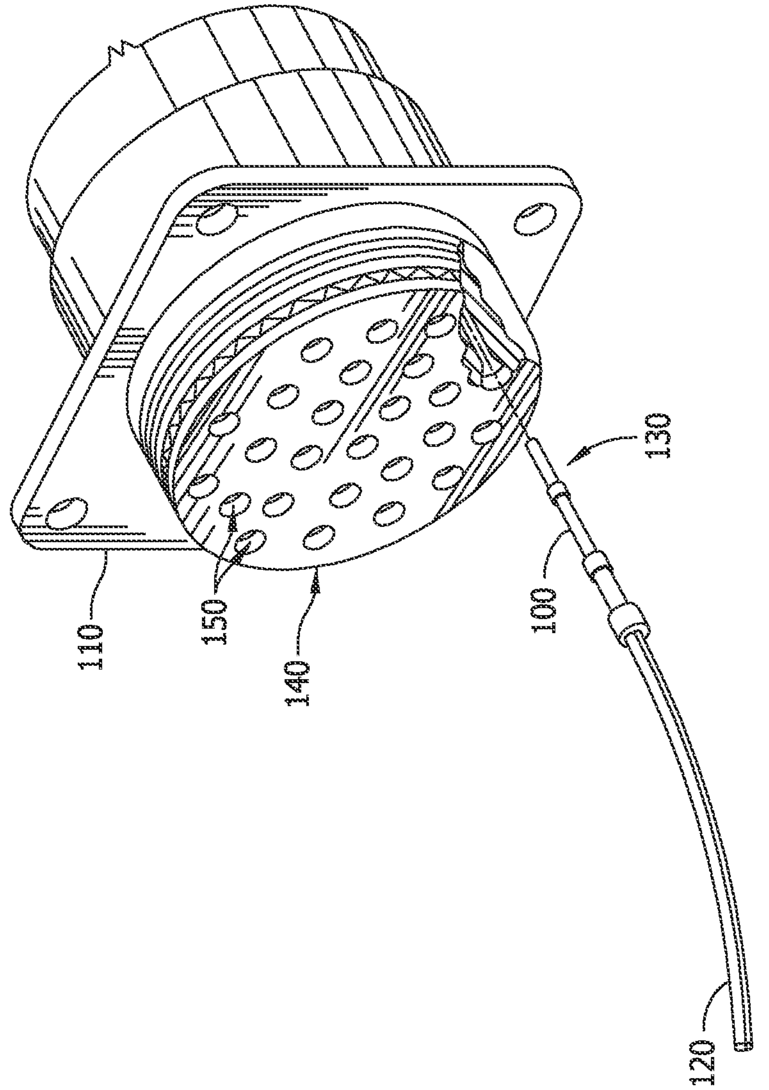
FIG. 1 is an isometric view of an exemplary electrical contact with a detailed sectionalized view and an exemplary electrical connector.

FIG. 1 shows an exemplary electrical contact 100 and an exemplary electrical connector 110. In the exemplary embodiment, electrical contact 100 is attached, electrically and mechanically, to a wire 120 and includes a tip 130 extending from wire 120. In the exemplary embodiment, electrical connector 110 includes a grommet 140 that defines at least one opening 150 having a predetermined depth. In the exemplary embodiment, tip 130 and the remainder of electrical contact 100 are sized and/or configured to be positioned at least partially within opening 150 and seated within grommet 140.

Figure 2:
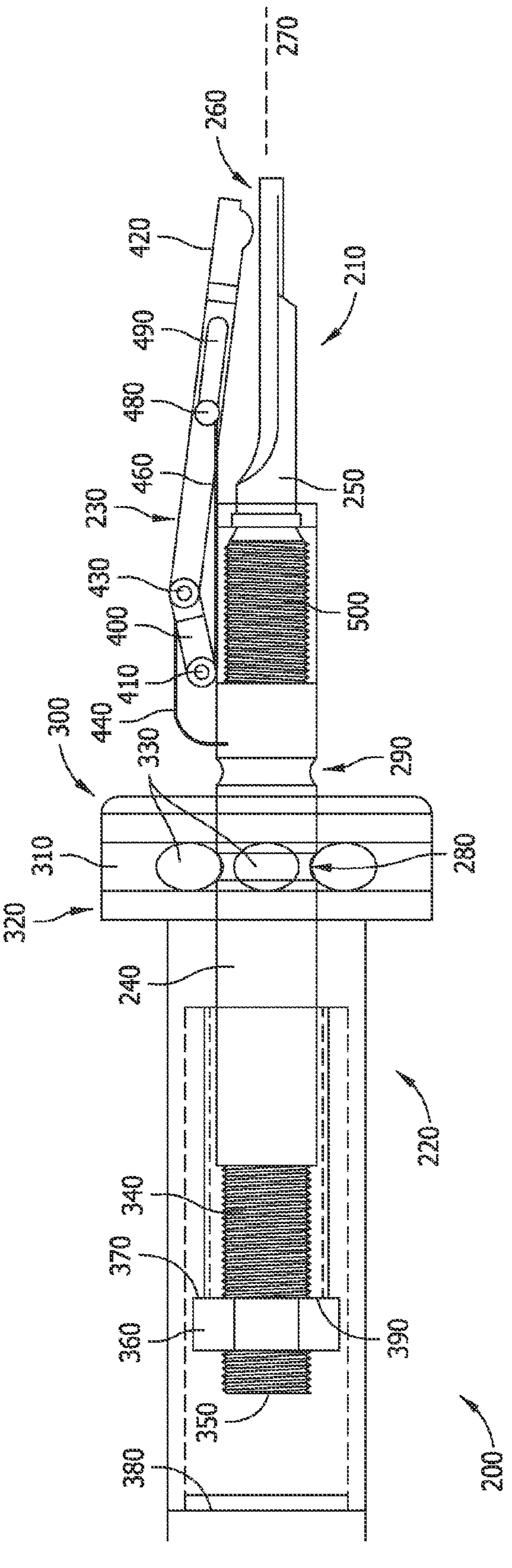
FIG. 2 is a schematic illustration of an electrical contact insertion tool that may be used to install the electrical contact into the electrical connector, both shown in FIG. 1, wherein the electrical contact insertion tool is in a first configuration.
Figure 3:
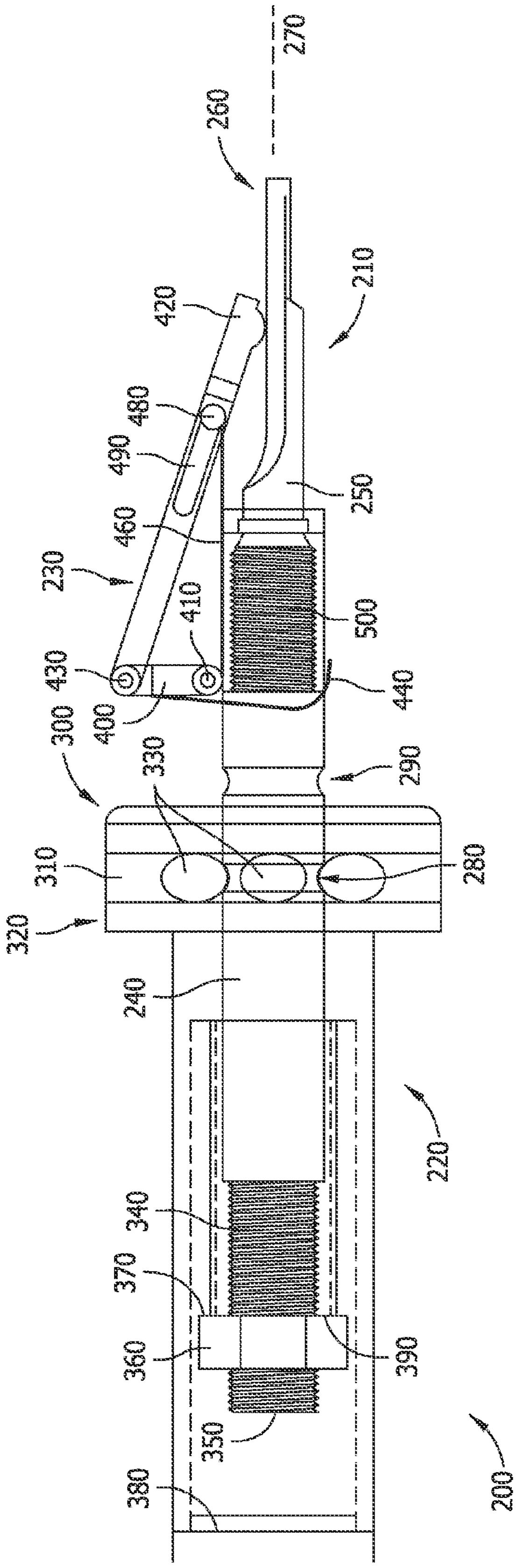
FIG. 3 is a schematic illustration of the electrical contact insertion tool shown in FIG. 2 in a second configuration.
Figure 4:
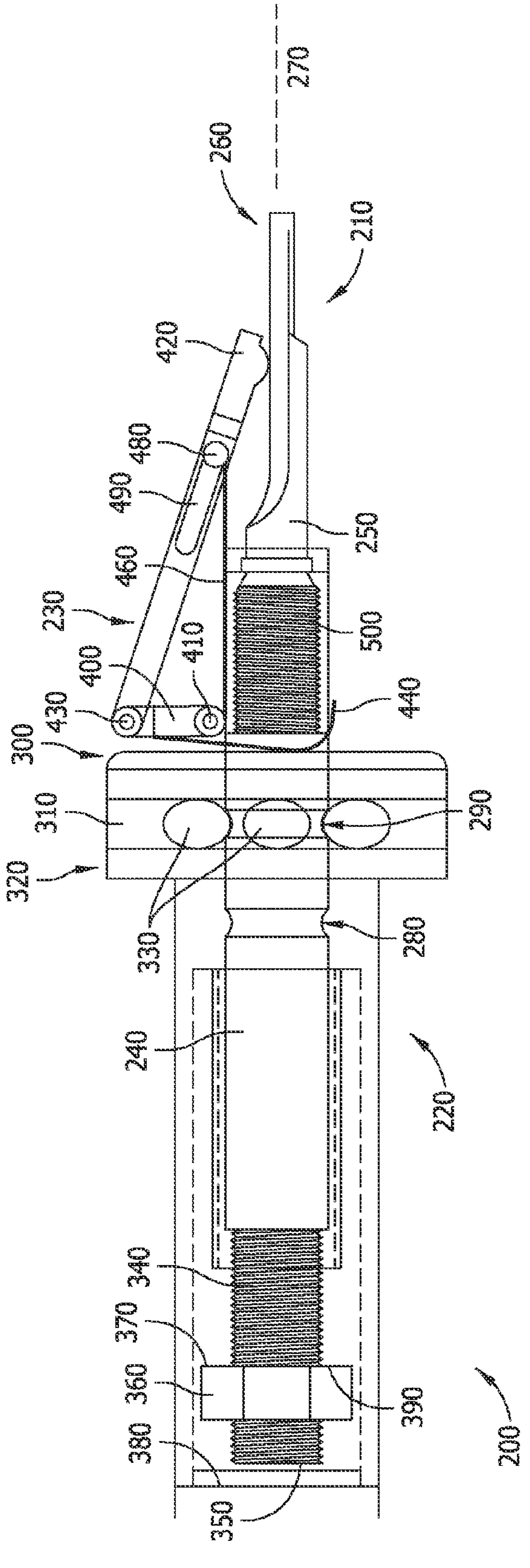
FIG. 4 is a schematic illustration of the electrical contact insertion tool shown in FIG. 2 in a third configuration.

FIGS. 2, 3, and 4 show an electrical contact insertion tool 200 that may be used for positive insertion of electrical contact 100 into electrical connector 110. More specifically, FIG.

2 shows insertion tool in a first configuration, FIG. 3 shows insertion tool 200 in a second configuration, and FIG. 4 shows insertion tool in a third configuration 200. In one implementation, insertion tool 200 includes an outer housing fabricated from a plastic material. Alternatively, the outer housing may be fabricated from any other material that enables insertion tool 200 to function as described herein. In one implementation, the outer housing is sized, shaped, and/or configured to ergonomically interface with an operator. Alternatively, the outer housing may have any other size, shape, and/or configuration that enables insertion tool 200 to function as described herein.

In the exemplary embodiment, insertion tool 200 includes an insertion assembly 210, a handle assembly 220 slidably coupled to insertion assembly 210, and a retention mechanism 230. In the exemplary embodiment, insertion assembly 210 includes a body 240 and an inserter 250 extending longitudinally from body 240. In the exemplary embodiment, inserter 250 includes a surface 260 extending substantially within a plane and oriented to receive wire 120 and/or electrical contact 100. In one implementation, surface 260 has a crescent-shaped or arcuate cross-section oriented to at least partially circumscribe wire 120 and/or electrical contact 100. Alternatively, inserter 250 may have any other size, shape, and/or configuration that enables insertion assembly 210 to function as described herein.

In the exemplary embodiment, at least a portion of body 240 extends through handle assembly 220 and is translatable therethrough. In the exemplary embodiment, insertion tool 200 is configured to present an indication when a predetermined amount of longitudinal force is applied to inserter 250 for installing electrical contact 100. In the exemplary embodiment, body 240 includes a first detent 280 and a second detent 290 longitudinally spaced from first detent 280. In the exemplary embodiment, handle assembly 220 includes a latching mechanism 300 that is positionable within first detent 280 and/or second detent 290, and a biasing mechanism 310 that is configured to bias latching mechanism 300 towards first detent 280 when insertion assembly 210 is in a first position (shown in FIGS. 2 and 3) with respect to handle assembly 220 and towards second detent 290 when insertion assembly 210 is in a second position (shown in FIG. 4) with respect to handle assembly 220.

In the exemplary embodiment, biasing mechanism 310 is configured to retain insertion assembly 210 in the first position and/or in the second position with a first predetermined amount of force when the insertion assembly is in the first position and/or in the second position, respectively. When a longitudinal force applied to insertion assembly 210 results in a force that exceeds a first predetermined threshold (e.g., the first predetermined amount of force), in the exemplary embodiment, latching mechanism 300 is released or unseated from first detent 280 and/or second detent 290, and insertion assembly 210 is translatable between the first position and the second position.

In one implementation, a longitudinal force between approximately 12.0 pounds and approximately 18.0 pounds results in a force that exceeds the first predetermined threshold. More specifically, in such an implementation, the longitudinal force is between approximately 14.0 pounds and approximately 16.0 pounds. Even more specifically, in such an implementation, the longitudinal force is approximately 15.0 pounds. Alternatively, the longitudinal force may be any other force that enables insertion tool 200 to function as described herein.

In one implementation, the first predetermined amount of force applied by biasing mechanism 310 is between approximately 2.0 pounds and approximately 8.0 pounds. More specifically, in such an implementation, the first determined amount of force is between approximately 3.0 pounds and approximately 6.0 pounds. Even more specifically, in such an implementation, the first predetermined amount of force is approximately 4.0 pounds. Alternatively, the first predetermined amount of force may be any other force that enables insertion tool 200 to function as described herein.

In one implementation, latching mechanism 300 includes a collar 320 and a plurality of balls 330 positioned within collar 320 radially about body 240, and biasing mechanism 310 is a spring coupled to and/or mounted on balls 330 and oriented to bias balls 330 radially inward towards body 240 with the first predetermined amount of force. In such an embodiment, when the longitudinal force applied to insertion assembly 210 results in a force that is sufficient to unseat balls 330 from first detent 280, the longitudinal force moves insertion assembly 210 relative to handle assembly 220 until balls 330 are seated within second detent 280. Alternatively, latching mechanism 300 and/or biasing mechanism 310 may have any other configuration that enables handle assembly 220 to function as described herein.

In the exemplary embodiment, insertion assembly 210 includes a bolt 340 having a proximal surface 350 and at least one nut 360 coupled to bolt 340 having a distal surface 370. In the exemplary embodiment, handle assembly 220 includes a first surface 380 that is oriented to engage proximal surface 350 and a second surface 390 that is oriented to engage distal surface 370. In the exemplary embodiment, bolt 340 and/or nut 360 function as a stop that regulates a movement of insertion assembly 210 relative to handle assembly 220. More specifically, in the exemplary embodiment, bolt 340, nut 360, first surface 380, and/or second surface 390 are spaced to restrict the translation of insertion assembly 210 to be at or between the first position and the second position.

In the exemplary embodiment, retention mechanism 230 is selectively movable between a first or extended configuration (shown in FIG. 2) and a second or flexed configuration (shown in FIGS. 3 and 4). In the exemplary embodiment, insertion tool 200 is configured to present an indication when electrical contact 100 is properly installed.

In the exemplary embodiment, retention mechanism 230 includes a base segment 400 hingably coupled to body 240 at a first joint 410, an arm segment 420 hingably coupled to base segment 400 at a second joint 430, and a biasing mechanism 440. In the exemplary embodiment, base segment 400 and arm segment 420 are configured to rotate about joints 410 and 430, respectively, within a common plane that is substantially perpendicular to the plane of inserter surface 260. In one implementation, biasing mechanism 440 is a wire grip spring. Alternatively, biasing mechanism 440 may be any other device and/or mechanism that enables retention mechanism 230 to function as described herein.

In the exemplary embodiment, retention mechanism 230 includes a guide 460 extending substantially parallel to center axis 270 of insertion assembly 210. More specifically, in the exemplary embodiment, guide 460 extends between first joint 410 and a pin 480 positioned within a slot 490 defined in arm segment 420 to facilitate regulating movement between the extended configuration and the flexed configuration and/or maintaining base segment 400 and/or arm segment 420 within the common plane. In the exemplary embodiment, pin 480 is movable between a first position when retention mechanism 230 is in the extended configuration and a second position when retention mechanism 230 is in the flexed configuration.

In the exemplary embodiment, retention mechanism 230 is configured to maintain the extended configuration until a force applied to retention mechanism 230 (e.g., a longitudinal force applied to retention mechanism 230 by grommet 140 as handle assembly 220 is advanced towards opening 150) moves retention mechanism 230 from the second configuration, and is biased towards the first configuration when the retention mechanism is moved from the second configuration.

When in the flexed configuration, retention mechanism 230 is configured to retain an object, such as wire 120, between retention mechanism 230 and insertion assembly 210 with a second predetermined amount of force. In the exemplary embodiment, insertion assembly 210 includes a biasing mechanism 500 coupled to inserter 250 that biases inserter 250 towards an equilibrium position extending longitudinally along center axis 270 of insertion assembly 210 while providing inserter 250 with at least some flexibility and/or resiliency.

In at least some implementations, the second predetermined amount of force is substantially similar to the first predetermined amount of force. In one implementation, the second predetermined amount of force applied by retention mechanism 230 is between approximately 2.0 pounds and approximately 8.0 pounds. More specifically, in such an implementation, the second determined amount of force is between approximately 3.0 pounds and approximately 6.0 pounds. Even more specifically, in such an implementation, the second predetermined amount of force is approximately 4.0 pounds. Alternatively, the second predetermined amount of force may be any other force that enables insertion tool 200 to function as described herein.

During operation, and in the exemplary embodiment, electrical contact 100 and/or wire 120 is positioned with respect to insertion assembly 210 for installation of electrical contact 100 into grommet 140. In the exemplary embodiment, insertion tool 200 is positioned in a first configuration (shown in FIG. 2). More specifically, in the exemplary embodiment, latching mechanism 300 is positioned within first detent 280, and retention mechanism 230 is in the extended configuration. In the exemplary embodiment, inserter 250 and thus electrical contact 100 are positioned substantially above and/or outside opening 150.

As handle assembly 220 is advanced towards opening 150, retention mechanism 230 engages grommet 140 and moves from the extended configuration towards the flexed configuration (shown in FIG. 3). More specifically, in the exemplary embodiment, latching mechanism 300 is positioned within first detent 280, and retention mechanism 230 is in the flexed configuration. In the exemplary embodiment, wire 120 is securely retained with the second predetermined amount of force between retention mechanism 230 and inserter 250.

As handle assembly 220 is further advanced towards opening 150, at least a distal end of insertion assembly 210 is positioned within opening 150 when electrical contact 100 engages electrical connector 110. When the longitudinal force applied to insertion assembly 210 results in a force that exceeds the first predetermined amount of force, in the exemplary embodiment, latching mechanism 300 is released or unseated from first detent 280 and is translated towards second detent 290.

In the exemplary embodiment, electrical contact 100 is at least is potentially properly installed when latching mechanism 300 is latched in second detent 290 (shown in FIG. 4). More specifically, in the exemplary embodiment, latching mechanism 300 is positioned within second detent 290, and retention mechanism 230 is in the flexed configuration. In the exemplary embodiment, wire 120 is securely retained with the second predetermined amount of force between retention mechanism 230 and inserter 250. As handle assembly 220 is withdrawn from opening 150, a sensor (not shown) and/or a user monitors whether electrical contact 100 remains retained between retention mechanism 230 and inserter 250. If electrical contact 100 is properly installed, electrical contact 100 will be released from between retention mechanism 230 and inserter 250 as handle assembly 220 is withdrawn from opening 150. If, on the other hand, electrical contact 100 is not properly installed, electrical contact 100 will remain retained between retention mechanism 230 and inserter 250 as handle assembly 220 is withdrawn from opening 150.

Upon installing electrical contact 100 and being withdrawn from opening 150, in the exemplary embodiment, insertion tool 200 is manually moved from the third configuration towards the first configuration. More specifically, in the exemplary embodiment, insertion assembly 210 is translated with respect to handle assembly 220 such that latching mechanism 300 is positioned within first detent 280, and retention mechanism 230 is manually moved towards the extended configuration. In at least one implementation, insertion tool 200 includes a reset mechanism that enables insertion tool 200 to be automatically moved from the second and/or third configuration towards the first configuration.

The present disclosure relates generally to hand tools and, more particularly, to a self-monitoring electrical contact insertion tool. Electrical contacts are likely to be fully seated when a certain amount of push force is applied to the electrical contact and/or the electrical contact can withstand a certain amount of pull force. The embodiments described herein enable a user to quickly and repeatedly apply a predetermined amount of push force to the electrical contact and/or apply a predetermined amount of pull force to the electrical contact. Moreover, the embodiments described herein quickly provide feedback associated with the push and pull forces to facilitate determining whether an electrical contact is fully seated.

Exemplary embodiments of a self-monitoring electrical contact insertion tool are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hand tool for use in coupling an electrical contact with an electrical connector, said tool comprising:

an insertion assembly;

a handle assembly slidably coupled to the insertion assembly such that the insertion assembly is translatable between an at least partially retracted position and an extended position relative to the handle assembly, the handle assembly configured to retain the insertion assembly relative to the handle assembly when the handle assembly applies a first predetermined amount of force to the insertion assembly, and the handle assembly configured to release the insertion assembly when a force applied by the insertion assembly to the handle assembly is greater than the first predetermined amount of force; and a retention mechanism selectively movable between a first configuration and a second configuration, the retention mechanism configured to retain a wire between the retention mechanism and the insertion assembly with a second predetermined amount of force when the retention mechanism is in the second configuration.

2. The hand tool in accordance with claim 1, wherein the insertion assembly comprises a body that comprises a first detent, and the handle assembly comprises a latching mechanism positionable within the first detent and a biasing mechanism, wherein the biasing mechanism is configured to bias the latching mechanism towards the first detent to position the insertion assembly in the extended position.

3. The hand tool in accordance with claim 2, wherein the insertion assembly comprises a second detent longitudinally spaced from the first detent, wherein the biasing mechanism is configured to bias the latching mechanism towards the second detent to position the insertion assembly in the at least partially retracted position.

4. The hand tool in accordance with claim 1, wherein the insertion assembly comprises a body and an inserter extending longitudinally from the body, wherein at least a portion of the body extends through the handle assembly.

5. The hand tool in accordance with claim 1, wherein the insertion assembly comprises a stop, and the handle assembly comprises at least one surface oriented to engage the stop.

6. The hand tool in accordance with claim 1, wherein the insertion assembly comprises a biasing mechanism and an inserter coupled to the biasing mechanism.

7. The hand tool in accordance with claim 1, wherein the retention mechanism comprises a base segment, an arm segment hingably coupled to the base segment, and a biasing mechanism, wherein the retention mechanism is configured to maintain the first configuration until a force applied to the retention mechanism moves the retention mechanism from the first configuration, and is biased towards the second configuration when the retention mechanism is moved from the first configuration.

* * * * *